(12) United States Patent
Robinson-Welsh

(10) Patent No.: US 12,227,949 B2
(45) Date of Patent: Feb. 18, 2025

(54) DRAINAGE SYSTEM

(71) Applicant: ACO AHLMANN SE & CO. KG, Budelsdorf (DE)

(72) Inventor: Neill Robinson-Welsh, Maulden (GB)

(73) Assignee: ACO AHLMANN SE & CO. KG, Budelsdorf (DE)

( * ) Notice: Subject to any disclaimer, the term of this patent is extended or adjusted under 35 U.S.C. 154(b) by 179 days.

(21) Appl. No.: 17/757,892

(22) PCT Filed: Jan. 7, 2021

(86) PCT No.: PCT/EP2021/050161
§ 371 (c)(1),
(2) Date: Jun. 23, 2022

(87) PCT Pub. No.: WO2021/140136
PCT Pub. Date: Jul. 15, 2021

(65) Prior Publication Data
US 2023/0029896 A1 Feb. 2, 2023

(30) Foreign Application Priority Data

Jan. 10, 2020 (GB) ..................................... 2000402

(51) Int. Cl.
*E04D 13/04* (2006.01)
*E04D 11/00* (2006.01)
*E04D 11/02* (2006.01)

(52) U.S. Cl.
CPC .......... *E04D 13/0409* (2013.01); *E04D 11/02* (2013.01); *E04D 13/0477* (2013.01);
(Continued)

(58) Field of Classification Search
CPC ................. E04D 13/0409; E04D 11/02; E04D 2013/0427; E04D 2013/044;
(Continued)

(56) References Cited

U.S. PATENT DOCUMENTS 2,666,493 A * 1/1954 Gordon ............... E04D 13/0409
210/166
2,740,490 A * 4/1956 Matheis .............. E04D 13/0409
210/166
(Continued)

FOREIGN PATENT DOCUMENTS

CN 205063197 U * 3/2016
CN 106401083 A * 2/2017
(Continued)

OTHER PUBLICATIONS

Translation CN205063197U (Year: 2016).*
(Continued)

*Primary Examiner* — Omar F Hijaz
(74) *Attorney, Agent, or Firm* — Pearne & Gordon LLP

(57) ABSTRACT

The invention refers to a drainage system (100), in particular a roof drainage system, comprising an outlet member (10) and a flow restrictor (20), whereby the flow restrictor (20) is situated above the outlet member (10). The flow restrictor (20) comprises a contact portion (22) and the outlet member (10) comprises a flange portion (12), whereby a first sealing member (30) is arranged on and/or along the flange portion (12) of the outlet member (10) and a second sealing member (40) is arranged at the contact portion (22) of the flow restrictor (20).

13 Claims, 3 Drawing Sheets

Figure 1:
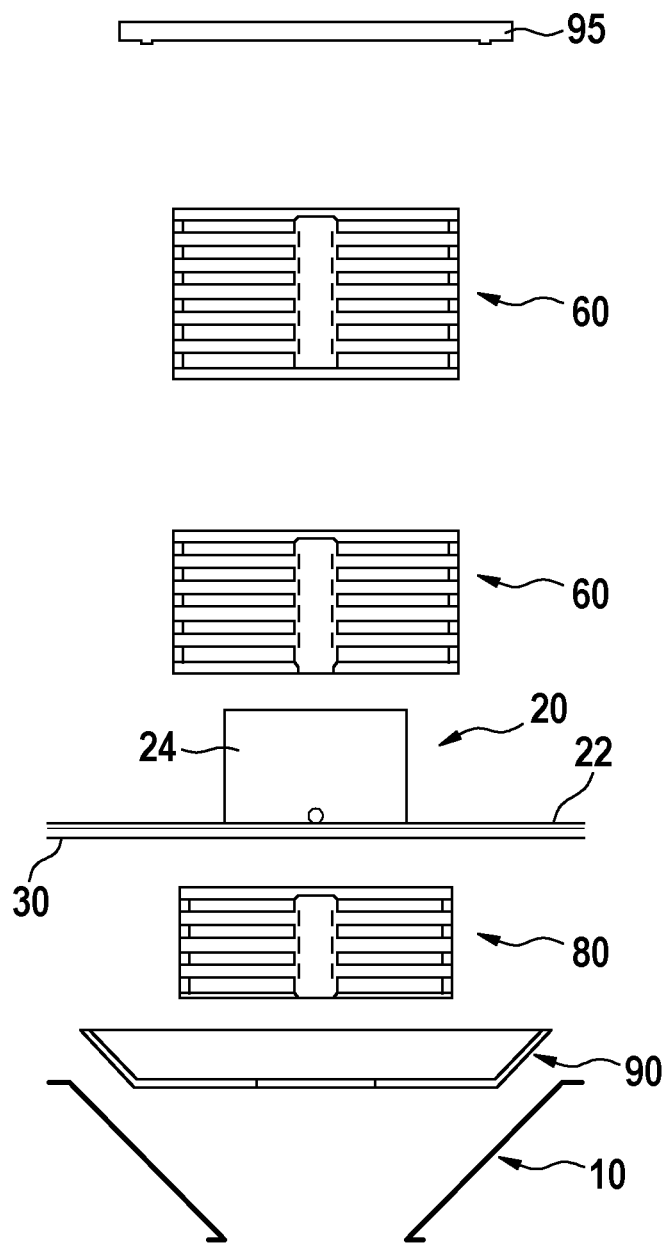

(52) U.S. Cl.
CPC .... *E04D 11/002* (2013.01); *E04D 2013/0413* (2013.01); *E04D 2013/0427* (2013.01); *Y02B 80/32* (2013.01)

(58) Field of Classification Search
CPC ............... E04D 13/0477; E04D 11/002; E04D 2013/0413; E04D 2013/0422; Y02A 30/254; Y02B 80/32
See application file for complete search history.

(56) References Cited

U.S. PATENT DOCUMENTS

| | | | |
|---|---|---|---|
| 5,144,781 A | 9/1992 | Fitzner | |
| 5,144,782 A | 9/1992 | Paquette et al. | |
| 5,216,767 A * | 6/1993 | Elmore | E03F 5/0408 137/362 |
| 5,615,526 A * | 4/1997 | Palmer | E04D 13/0431 52/302.1 |
| 5,771,507 A * | 6/1998 | Healy | E03C 1/22 4/651 |
| 8,918,926 B1 * | 12/2014 | Herring | E03F 5/0408 4/613 |
| 9,567,739 B2 * | 2/2017 | Nyce | E03F 5/0407 |

FOREIGN PATENT DOCUMENTS

| | | |
|---|---|---|
| DE | 7707910 U1 | 7/1977 |
| ES | 537924 A3 | 11/1984 |
| ES | 8601375 A3 | 11/1985 |
| GB | 1 594 951 A | 8/1981 |

OTHER PUBLICATIONS

International Search Report issued in PCT/EP2021/050161; Mailing Date: Mar. 5, 2021.
The Examination Report issued in corresponding Indian Patent Application No. 202227042421; Mailing Date: Nov. 29, 2022.

* cited by examiner

DRAINAGE SYSTEM

The invention refers to a drainage system, in particular a roof drainage system.

Usual drainage systems, in particular usual roof drainage systems, comprise a sealing layer in order to avoid fluid, in particular water, to penetrate into the below structure, e.g. rooftop structure like an insulation or the like. Thus, leakage of the sealing member is very problematic as this can cause severe damage to the whole supporting structure.

However, in case of providing a planting or greening on rooftops the sealing member is almost continuously exposed to hydraulic pressure. Further, providing of a long term water storage is beneficial in order to provide the planting with sufficient amount of water. Additionally, an extensive exposure of the sealing of a rooftop structure can also occur in case of a blockage of the drain, e.g. during heavy rainfalls.

It is an object of the invention to provide a drainage system, in particular a roof drainage system, which allows for an easy and cost efficient installation as well as a reliable sealing and drainage function, particularly to provide the option for a so called blue roof comprising a storage for water.

The object with regard to the system is solved by the subject-matter according to claim 1. Preferred embodiments of the invention are mentioned in the dependent claims.

According to the invention a drainage system is provided, in particular a roof drainage system, comprising an outlet member and a flow restrictor, whereby the flow restrictor is situated above the outlet member. The flow restrictor comprises a contact portion and the outlet member comprises a flange portion, whereby a first sealing member is arranged on and/or along the flange portion of the outlet member and a second sealing member is arranged at the contact portion of the flow restrictor, and whereby the first and second sealing member are arranged partially parallel to each other and spatially separated from each other, in particular separated from each other in vertical direction, such that a drainage between the first and second sealing member into the outlet member is providable.

The invention is based on the idea, that a first and a second sealing member are provided as separated layers. The first sealing member acts as a usual fluid tight sealing. The second sealing can act in kind of a fluid storage member and thus provides a volume which can be filled with water.

By separating the first and second sealing member to be independent from each other, an improved fluid tight sealing can be provided, whereby the first sealing member is released from prolonged hydrostatic pressure.

In consequence, an improved fluid tight sealing as well as an improved functionality with regard to water storage and water drainage can be provided, in particular in the context of roof drainage systems. Furthermore, the system is cost efficient and does not necessitate additional efforts during manufacturing.

According to a preferred embodiment, the second sealing member extends in horizontal direction and at its horizontal ends, in particular at its outer horizontal ends, extends in vertical direction in order to form a water storage.

According to another preferred embodiment the second sealing member extends in vertical direction at its horizontal ends such that a predeterminable height of the water storage can be provided.

Thus, the second sealing member, being fixed to the flow restrictor, in particular to the contact portion of the flow restrictor, defines a volume for fluid storage. In particular, the second sealing member is provided in form of a layer which comprises a horizontal extension and a vertical extension. Thus, the ground area of the fluid storage as well as the maximum height of the fluid storage is defined by the second sealing member.

Advantageously, a water storage can be defined by the second sealing member and independent from the first sealing member. Thus, an improved sealing e.g. of a rooftop is achieved, even in case of a so called blue roof solution, comprising an additional long time water storage.

In on preferred embodiment of the invention, the second sealing member is arranged on, along and/or below the contact portion of the flow restrictor member.

According to another preferred embodiment the second sealing member is fixable to the contact portion of the flow restrictor by an adhesive member, by a clamping member or the like.

The second sealing member can be fixed to the flow restrictor in an arbitrary manner in order to create a fluid tight connection. Thus, the present invention provides a cost efficient solution which can be easily manufactured and arranged e.g. on a rooftop.

In another preferred embodiment the contact portion of the flow restrictor is provided as a connection area for the second sealing member, in particular as a flange portion or the like. Thus, a suitable, in particular fluid tight, connection between the second sealing member and the flow restrictor can be provided.

In one preferred embodiment a drainage member is arranged between the first and second sealing member, to provide a water drainage along the outside of the second sealing member to the outlet member.

In one embodiment the drainage member is arranged such that water from the water storage member exceeding the maximum height of the vertically extending part of the second sealing member can be drained to the outlet member.

In case of an overflow of the water storage, as provided by the horizontally and vertically extending second sealing member, the overflowing water can be drained via the drainage member without influencing the first sealing member or the second sealing member.

According to another preferred embodiment of the invention, the first sealing member comprises at least a first liner, whereby the second sealing member comprises at least a second liner, preferably comprises a second liner in combination with a second geotextile.

Basically, the first and second sealing member are provided as flat structures which can comprise one or several layers.

In particular, the geotextile of the second sealing member can preferably be made of a polymer like polyethylene, in particular linear low-density polyethylene (LLDPE), or the like. Thus, the second sealing member can form a water storage with a maximum height which is sealed independently from the first sealing member of the system.

In one embodiment the flow restrictor comprises a chimney overflow member for drainage of water extending at least in vertical direction.

The chimney overflow member as an outlet of the flow restrictor allows for a build in increase of the water level, which has to be present until a water drainage via the flow restrictor is allowed.

Further, by providing a vertical outlet via the flow restrictor, the flow restrictor is less prone to be blocked by objects like garbage or the like.

According to another preferred embodiment, the system further comprises at least a first raising ring, whereby the first raising ring is arranged to the flow restrictor, preferably coaxially arranged, and situated above the contact portion of the flow restrictor.

By providing the at least one first raising ring, a surface level of e.g. a rooftop or the like can be increased beyond a drainage opening of the flow restrictor. In particular, the first raising ring allows for providing a planting with a certain height, preferably 200 to 1000 mm, on top of fluid storage as provided by the second sealing member.

Moreover, a cover member can be provided, whereby the at least one first raising ring is adapted to receive such a flat solid cover for partially closing the drainage path through the flow restrictor from the outside.

Thus, the drainage path can be hidden from the outside by the cover member and a potential danger for service personal or the like due the flow path being completely open on an upper end side can be avoided.

In another embodiment, the system further comprises at least a second raising ring, whereby the second raising ring is arranged to the flow restrictor, preferably coaxially arranged, and situated below the contact portion of the flow restrictor.

In particular, the second raising ring is arranged between the flow restrictor and the outlet member in order to provide a certain distance between the contact portion of the flow restrictor and the flange portion of the outlet member. Thus, the second raising ring can be considered as a spacer element between the outlet member and the flow restrictor.

The second raising ring ensures, that the drainage member can be situated between the first sealing member and the second sealing member and improves the stability of the system.

In particular, the (roof) drainage system can be considered as a so called blue roof system, allowing for a sealed water storage within the system. However, due to the first and second sealing member in combination with the flow restrictor and the outlet member, an advantageous sealing of e.g. a rooftop is achievable, even if an additional, long term water storage is provided by the second sealing member.

Further details of the invention are outlined in the following with reference to the enclosed figures.

Figure 2:
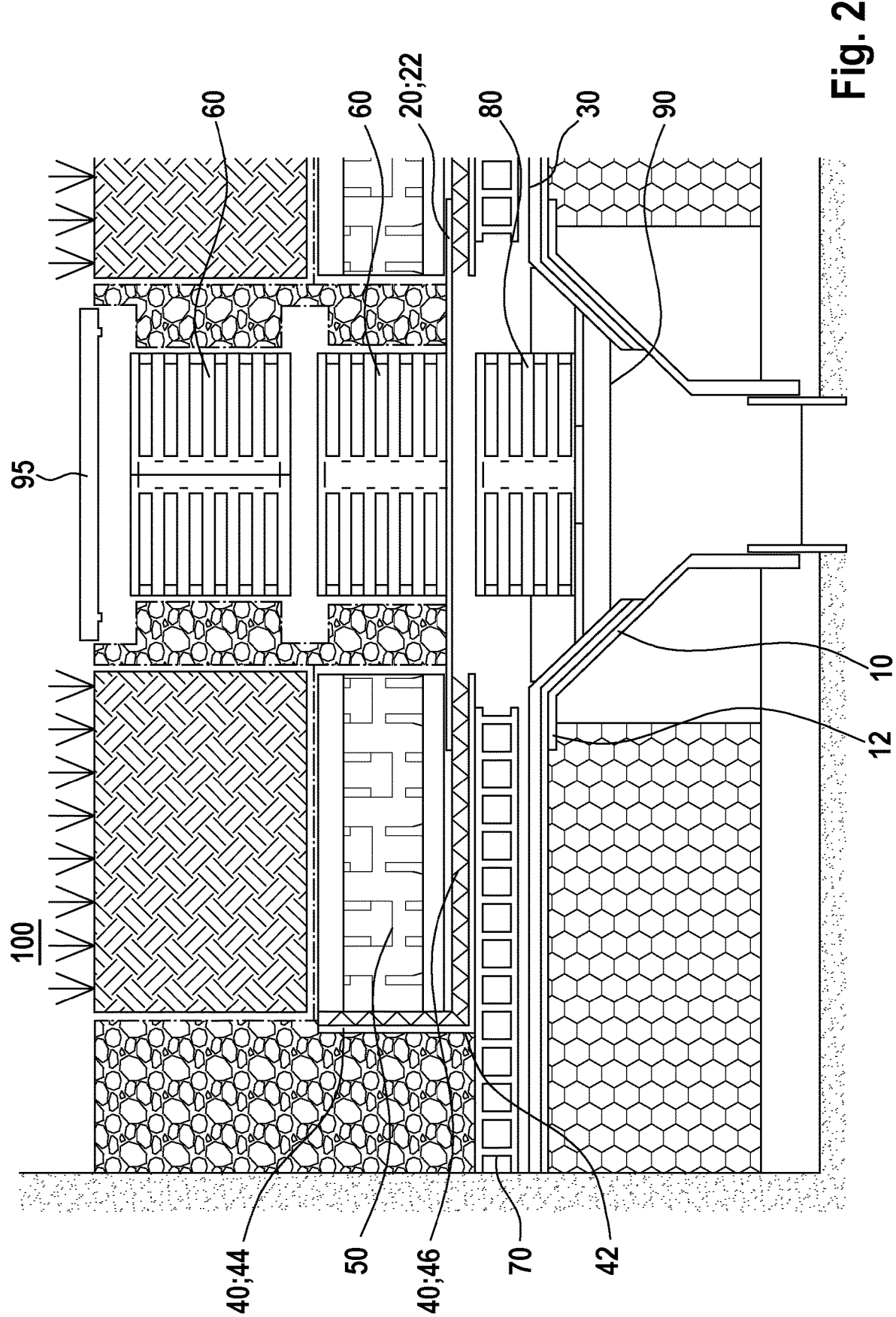

It is shown:

FIG. 1 an exploded illustration of a part of a drainage system;

FIG. 2 a cross-sectional view of the system; and

Figure 3:
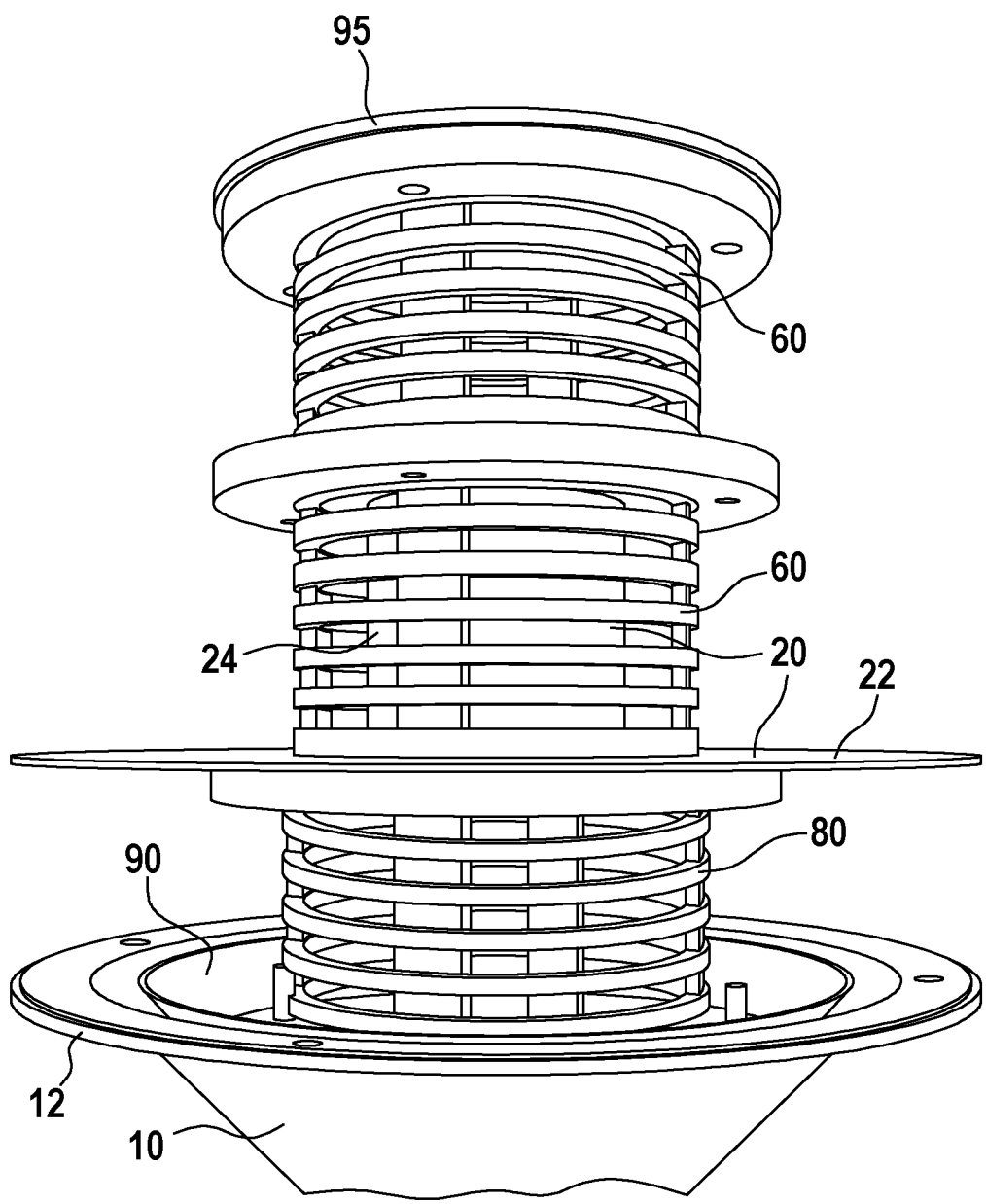

FIG. 3 a perspective view of the embodiment of the system according to FIG. 1.

In FIG. 1 an exploded illustration of a part of a drainage system 100 is shown. FIG. 3 further illustrates a perspective view of the embodiment of the system according to FIG. 1.

The system 100 comprises an outlet member 10, a flow restrictor 20, a first sealing member 30, at least one first raising ring 60 and at least one second raising ring 80. In particular, the outlet member 10 and the flow restrictor 20 are coaxially aligned with each other.

Furthermore, the part of the system 100 is illustrated with a clamping ring 90 and a cover member 95.

The flow restrictor 20 comprises a contact portion 22 as well as a vertical chimney overflow member 24 for drainage of fluid. Thus, water can be drained through the flow restrictor 20 to the outlet member 10 as soon as the water level exceeds the height of the chimney overflow member 24.

The outlet member 10 is a funnel-shaped outlet member 10 in order to facilitate drainage of fluid. The outlet member 10 comprises a flange portion 12.

Inside the funnel-shaped outlet member 10 the clamping ring 90 can be arranged in combination with the second raising ring 80. In particular, the raising ring 80 is supported by the clamping ring, comprising a funnel-shaped outer circumference to fit into the funnel-shaped outlet member 10, at a lower side of the raising ring 80.

Above the second raising 80 the flow restrictor 20 is arranged, whereby the second raising ring 80 supports the contact portion 22 of the flow restrictor 20. Thus, a vertical distance between the flange portion 12 of the outlet member 10 and the contact portion 22 of the flow restrictor 20 can be set by the second raising ring 80.

In FIG. 1, the contact portion 22 of the flow restrictor 20 is provided in the form of a flange portion.

Further, according to FIG. 1 the second sealing member 30 is situated below the contact portion 22 of the flow restrictor 20.

Above the flow restrictor 20, in particular on the contact portion 22 of the flow restrictor 20, at least one first raising ring 60 is arranged. According to FIG. 1 two first raising rings 60 are arranged on top of each other in order to provide an increased height for arrangement of the cover member 95.

According to FIG. 1 the two first raising rings 60 are arranged on and/or above and/or along the flow restrictor 20.

The second and/or the first raising rings 80; 60 can be provided with a flange portion or any other kind of portion in order to be fixable to the outlet member 10 and/or the clamping ring 90.

In FIG. 2 a cross-sectional view of the system 100 is shown.

In addition to FIG. 1 the system 100 is illustrated with the first sealing member 30 which is situated along the flange portion 12 of the outlet member 10 and reaches into the funnel-shaped outlet member 10.

The second sealing member 40 is situated below the flow restrictor 20, in particular below the contact portion 22 of the flow restrictor 20. The second sealing member 40 can be adhesively bonded to the flow restrictor 20 or can be clamped to the flow restrictor 20 by additional clamping member.

Alternatively, the second sealing member 40 can be arranged and fixed on top of the flow restrictor 20, in particular on top of the contact portion 22 of the flow restrictor 20.

According to FIG. 2, the first and second sealing member 30; 40 are vertically and spatially separated from each other for providing a drainage function between the first and second sealing member 30; 40 to the outlet member 10. In particular, a drainage member 70 is arranged between the first and second sealing member 30; 40.

Furthermore, the first and second sealing member 30; 40 can comprise several layers. According to FIG. 2 the second sealing member 40 can comprise a second liner and a second geotextile in order to provide an adequate sealing function. The first sealing member 30 can be provided as a first liner in order to seal any kind of insulation or the like being situated below and around the outlet member 10.

The second sealing member 40 further extends in horizontal direction from the flow restrictor 20 and comprises horizontal ends 42. At these horizontal outer end sides 42, the second sealing member 40 further extends in vertical direction such that a water storage can be formed by the second sealing member 40.

Additionally, within the additional water storage being particularily formed by the second sealing member 40, a water storage member 50 can be provided in order to provide suitable stability of above arranged layers like any kind of planting.

The height of the planting layer or the like being arranged above can be defined by arrangement of one or multiple first raising rings 60. According to FIG. 2 to raising rings 60 are provided such that a planting layer with a certain height can be provided on top of the long term water storage comprising a structural strengthening water storage member 50.

In summary, by providing the flow restrictor 20 with a chimney-like outlet/chimney overflow member 24 in combination with the second sealing member 40 comprising vertically extending end sides 42, a long term water storage is achievable.

In case the water level within the water storage exceeds a predetermined height, water can be discharged via the chimney overflow member/chimney-like outlet 24 of the flow restrictor 20. Further, water can also be discharged by exceeding the vertical height of the end sides 42 of the second sealing member 40. In this case, the water can be discharged through the discharge member 70 being situated between the first and second sealing member 30; 40 to the outlet member 10.

In summary the present invention provides a securely sealed option for providing a long term water storage or reservoir, whereby the second sealing member for providing a water reservoir is independent from the first sealing member. Thus, the first sealing member does not suffer from long term hydraulic pressure and can provide a secure seal of e.g. a rooftop structure.

Additionally, the present invention is cost efficient and easy to assemble on site, e.g. on a rooftop. Advantageously, the drainage member 70 in between the first and second sealing member 30; 40 provides an additional drainage function in case of e.g. heavy rainfalls or the like leading to an exceeding water level in the water storage or in case of a blockage of the flow restrictor 20. In this case, water can flow over the vertically extending side ends 42 of the second sealing member 40 and can be discharged through the drainage member 70.

LIST OF REFERENCE SIGNS

10 Outlet member
12 Flange portion
20 Flow restrictor
22 Contact portion
24 Chimney overflow member/chimney-like outlet
30 First sealing member
40 Second sealing member
42 Horizontal ends
44 Second liner
46 Second geotextile
50 Water storage member
60 First raising ring
70 Drainage member
80 Second raising ring
90 Clamping ring
95 Cover member
100 Roof drainage system

The invention claimed is:

1. Drainage system (100) comprising an outlet member (10) and a flow restrictor (20),
the flow restrictor (20) is situated above the outlet member (10), the flow restrictor (20) comprises a contact portion (22) and the outlet member (10) comprises a flange portion (12),
a first sealing member (30) is arranged on and/or along the flange portion (12) of the outlet member (10) and a second sealing member (40) is arranged at the contact portion (22) of the flow restrictor (20),
the second sealing member (40) has a central section that extends in a horizontal direction and ends (42) that extend in a vertical direction to form a water storage,
the first sealing member (30) and the second sealing member (40) are arranged partially parallel to each other and spatially separated from each other such that a drainage between the first and the second sealing members (30; 40) into the outlet member (10) is provided;
wherein a drainage member (70) is arranged below the second sealing member (40) to provide a water drainage along an outside of the second sealing member to the outlet member.

2. Drainage system (100) according to claim 1,
wherein the horizontal ends (42) have a predeterminable height to provide the water storage.

3. Drainage system (100) according to claim 1,
wherein the second sealing member (40) is arranged on, along or below the contact portion (22) of the flow restrictor member (20).

4. Drainage system (100) according to claim 1,
wherein the second sealing member (40) is fixed to the contact portion (22) of the flow restrictor (20).

5. Drainage system (100) according to claim 1,
wherein the contact portion (22) of the flow restrictor (20) is provided as a connection area for the second sealing member (40).

6. Drainage system (100) according to claim 1,
wherein the drainage member (70) is arranged such that water from a water storage member exceeding the maximum height of a vertically extending part of the second sealing member (40) can be drained to the outlet member (10).

7. Drainage system (100) according to claim 1,
wherein the first sealing member (30) comprises at least a first liner (30), the second sealing member (40) comprises at least a second liner (44) and a geotextile (46).

8. Drainage system (100) according to claim 1,
wherein the flow restrictor (20) comprises a chimney overflow member (24) for drainage of water extending at least in vertical direction.

9. Drainage system (100) according to claim 1,
wherein the system (100) further comprises at least a first raising ring (60), the first raising ring (60) is connected to the flow restrictor (20) and situated above the contact portion (22) of the flow restrictor (20).

10. Drainage system (100) according to claim 9,
wherein the drainage system (100) further comprises at least a second raising ring (80), the second raising ring (80) is connected to the flow restrictor (20) and situated below the contact portion (22) of the flow restrictor (20).

11. Drainage system (100) according to claim 1,
wherein the drainage member (70) is arranged vertically above the first sealing member (30).

12. Drainage system (100) according to claim 1,
wherein the drainage member (70) is arranged vertically below the flow restrictor (20).

13. Drainage system (100) comprising an outlet member (10) and a flow restrictor (20), the flow restrictor (20) is situated above the outlet member (10), the flow restrictor (20) comprises a contact portion (22) and the outlet member (10) comprises a flange portion (12), a first sealing member (30) is arranged on and/or along the flange portion (12) of the outlet member (10) and a second sealing member (40) is arranged at the contact portion (22) of the flow restrictor (20),the second sealing member comprising an end extending in a vertical direction to form a water storage, the first sealing member (30) and the second sealing member (40) are arranged partially parallel to each other and spatially separated from each other such that a drainage between the first and the second sealing members (30; 40) into the outlet member (10) is provided; and a drainage member (70) is arranged vertically between the first and the second sealing members (30; 40), and below the second sealing member (40), to provide a water drainage along an outside of the second sealing member (40) to the outlet member (10).

\* \* \* \* \*